UNITED STATES PATENT OFFICE.

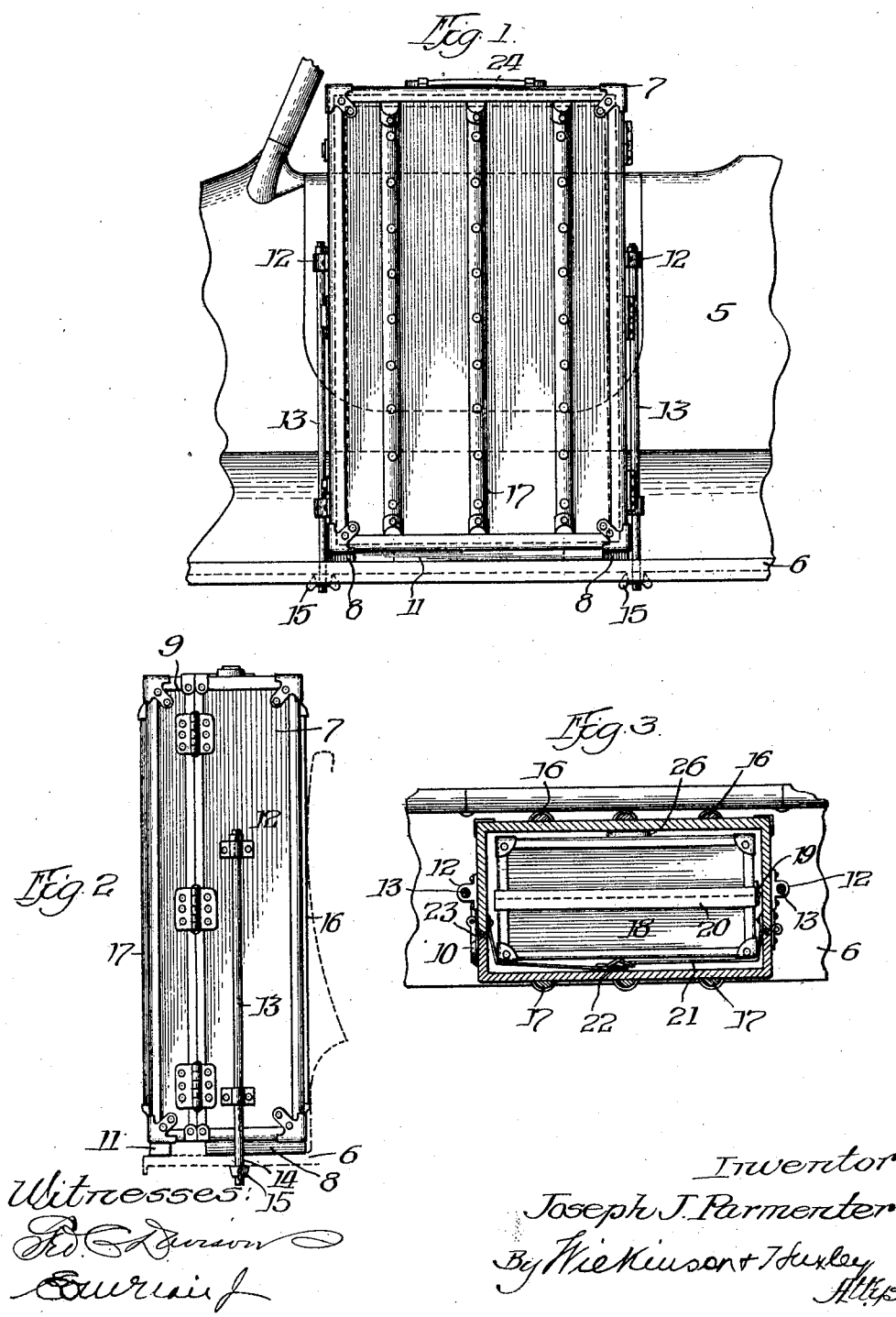

JOSEPH J. PARMENTER, OF CHICAGO, ILLINOIS, ASSIGNOR TO MARSHALL FIELD & COMPANY, OF CHICAGO, ILLINOIS, A CORPORATION OF ILLINOIS.

AUTOMOBILE-TRUNK.

1,401,183.     Specification of Letters Patent.    Patented Dec. 27, 1921.

Application filed April 10, 1918. Serial No. 227,649.

*To all whom it may concern:*

Be it known that I, JOSEPH J. PARMENTER, a citizen of the United States, residing at Chicago, in the county of Cook and State of Illinois, have invented certain new and useful Improvements in an Automobile-Trunk, of which the following is a specification.

My invention relates to trunks and particularly to trunks for use with automobiles.

One of the objects of my invention is to provide a convenient trunk which may be securely, although removably supported upon automobiles.

Another object is to provide a trunk for automobiles which will be so supported as to be readily accessible and at the same time substantially waterproof.

A further object is to provide a protector for automobile trunks which also serves as the supporting means.

A still further object is to provide a protector for automobile trunks which will support and permit ready removal and replacement of said trunk with respect to the automobile.

A still further object is to provide an automobile trunk which may be attached to the vehicle without provision of special fixtures on the vehicle.

These and other objects will be apparent from the drawings, wherein—

Figure 1 shows an elevation of a trunk embodying the preferred form of my invention applied to the running board of an automobile;

Fig. 2 is an end view looking at the right hand end of Fig. 1, and

Fig. 3 is a top plan view with a portion of the inclosing casing cut away.

For providing the proper clothing container for attachment to automobiles, various arrangements have been devised. It is very necessary in such an arrangement to provide means whereby the contents of the trunk may be protected from dust, rain, and the like, and also to permit ready removal of the trunk from the vehicle. It is the object of my invention to provide an easily accessible automobile trunk and mount same in such a manner on the automobile so as to be readily accessible at all times and removable for carrying into a building, hotel and the like.

I accomplish the above recited and other objects by providing an inclosing casing securely fastened preferably to the running board of the automobile on the driver's side thereof, and then removably mounting within the casing the portable trunk suitably provided with proper compartments for containing clothing, hats, etc.

Attention is directed to the drawings wherein 5 represents a fragmentary portion of an automobile body having the usual running board 6. On the running board 6 I mount in endwise position a trunk-like casing 7, which is supported under the body portion thereof by means of a bearing 8 preferably secured to the casing 7 and resting on the running board 6 and which casing is provided with a hinged cover 9 and suitable locking means 10 therefor. Under the lower end of the hinged cover 9 there is preferably no bearing inserted although a block 11 may be secured under the hinged corner if desired. For securing the casing on the running board I provide stirrups 12 riveted or otherwise secured to the sides of the casing 7 and through these pass long bolts 13 which extend through apertures 14, in the running board 6 and are securely fastened therein by nuts or other means 15 on the ends of the bolts. The rear portion of the casing 7 is provided preferably with rubbing strips 16 so as to have a slight bearing against the body 5 of the vehicle. If desired, similar rubbing strips 17 may be provided on the hinged cover 9 serving as protection to the cover both from passing vehicles and from contact with objects when the cover is swung open.

One of the features of my invention resides in the provision of the tongue and groove construction of the meeting edges of the casing 7 as shown at 23 in Fig. 3. The tongue and groove extend preferably around the meeting edges of the base portion and the hinged cover so that when the cover is closed a positive weatherproof construction results.

For serving as a container for clothes, I provide an interior trunk 18 which may comprise two sections vertically hinged as at 19 in the manner of wardrobe trunks. The trunk 18 is provided on one of the hinged portions with an overlapping strip 20 to serve as a protector against dust and dirt. For retaining the trunk against movement within the casing 7 I may provide a strap 21 secured to the sides of the casing 7 and having a buckle 22 for tightening the strap against the trunk 18. Suitable handles 26 are provided on the trunk 18 for moving the same preferably one on the front and one on the back.

The casing 7 is provided on top with a handle 24 so that it may be conveniently removed when desirable which can be done by taking off the nuts 15 on the bolt 13, the only evidence then remaining of such trunk attachment being the apertures 14 through the running board 6. The other fixtures which are required in the present day type of automobile trunk are absent as the provision of the means above described is sufficient to securely hold the casing 7 on the running board 6.

I am aware that modifications of such a device are possible and intend to include as coming within the scope of my invention all such modifications as come within the appended claims. I do not wish to limit my invention to the exact form shown and described.

I claim:

1. In combination, a running board of an automobile, a luggage carrier mounted thereon, said luggage carrier comprising a hinged casing provided with dust-proofing means to prevent the access of dust to the interior thereof, means for holding the contents of said casing against rattling, attachments on opposite sides of said casing and vertical rods coöperating with said attachments and extending through said running board for releasably holding said casing, said vertical rods being readily removable, whereby, when said luggage carrier is not being used, no obtrusive attachments appear.

2. In combination, a running board of an automobile, a luggage carrier mounted thereon, said luggage carrier comprising a hinged casing, attachments on opposite sides of said casing, vertical rods coöperating with said attachments and extending through said running board for releasably holding said casing, said vertical rods being readily removable, whereby, when said luggage carrier is not being used, no obtrusive attachments appear.

Signed at Chicago, State of Illinois, this 8th day of April, A. D. 1918.

JOSEPH J. PARMENTER.